United States Patent [19]

Ross

[11] Patent Number: 5,249,786
[45] Date of Patent: Oct. 5, 1993

[54] PIPE RESTRAINT SYSTEM

[75] Inventor: Jack Ross, Edinburgh, United Kingdom

[73] Assignee: British Gas plc, London, England

[21] Appl. No.: 853,629

[22] Filed: Mar. 19, 1992

[30] Foreign Application Priority Data

Mar. 19, 1991 [GB] United Kingdom ............... 9105817

[51] Int. Cl.⁵ .............................................. B25B 1/20
[52] U.S. Cl. ................................................... 269/43
[58] Field of Search ............ 29/237; 254/29 R, 29 A; 269/43, 130–133, 280, 282; 228/44.5, 49.3; 285/18, 21

[56] References Cited

U.S. PATENT DOCUMENTS

| 3,653,115 | 4/1972 | Perkins | 269/43 |
|---|---|---|---|
| 3,669,439 | 6/1972 | Sanchez | 269/130 |
| 3,711,920 | 1/1973 | Simmons | 269/43 |
| 3,901,497 | 8/1975 | Dearman | 228/49.3 |
| 3,954,005 | 5/1976 | Edwards | 254/29 A |
| 4,356,615 | 11/1982 | Dearman | 269/43 |
| 4,769,889 | 9/1988 | Landman et al. | 269/43 |
| 5,118,024 | 6/1992 | McClure | 269/43 |

FOREIGN PATENT DOCUMENTS

| 3322008 | 1/1985 | Fed. Rep. of Germany . |
|---|---|---|
| 2476268 | 8/1981 | France . |
| 1278112 | 6/1972 | United Kingdom . |
| 1342291 | 1/1974 | United Kingdom . |
| 1554807 | 10/1979 | United Kingdom . |
| 1576065 | 10/1980 | United Kingdom . |
| 2107743 | 5/1983 | United Kingdom . |
| 2198203 | 6/1988 | United Kingdom . |
| 2200963 | 8/1988 | United Kingdom . |
| 2215804 | 9/1989 | United Kingdom . |
| 2228056 | 2/1990 | United Kingdom . |

Primary Examiner—Robert C. Watson
Attorney, Agent, or Firm—Larson and Taylor

[57] ABSTRACT

Before effecting a cut-out operation to remove a section 24 of a pipeline such as a gas main, the pipe 10 is preloaded by clamping clamp assemblies 12, 14 around the pipe 10 and locating yokes 16, 18 against the assemblies. Struts 20, 22 engage the yokes and include hydraulic cylinders 32 which can be pressurized by a pump 30. Nuts (38) can be tightened onto the cylinders 32 to maintain the pre-load when the hydraulic pressure is removed. The force applied equals the otherwise unbalanced gas load "A" or "B" provided by the gas pressure in the pipe 10 acting on the stop plugs. Each clamp assembly comprises thrust members tightened against the pipe 10 by chains. The forces applied pre-loads the yokes equal to the forces provided by the gas pressure in the pipe 10 acting on the stop plugs. The thrust members are located on fabric straps which are adjusted to make the members equispaced and then tensioned to lock them in place before the chains are tensioned.

4 Claims, 6 Drawing Sheets

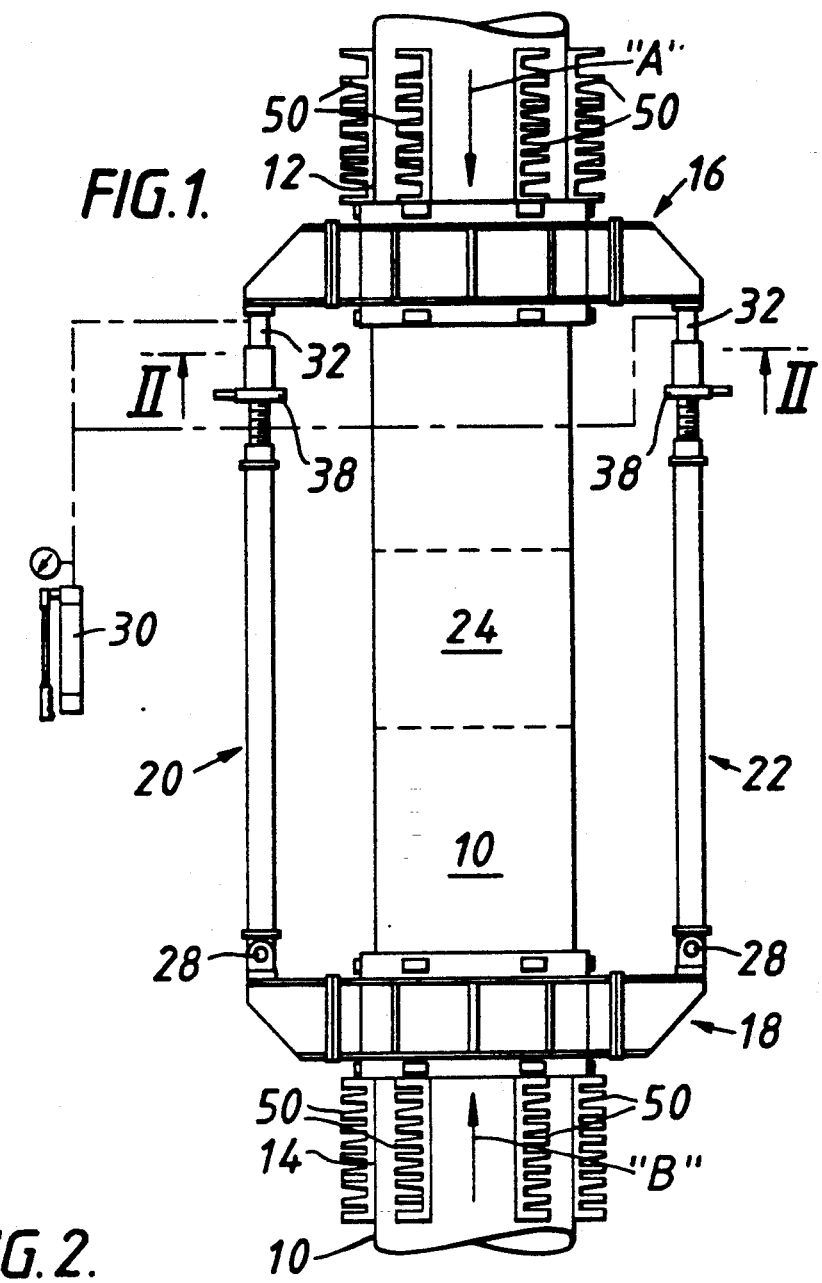
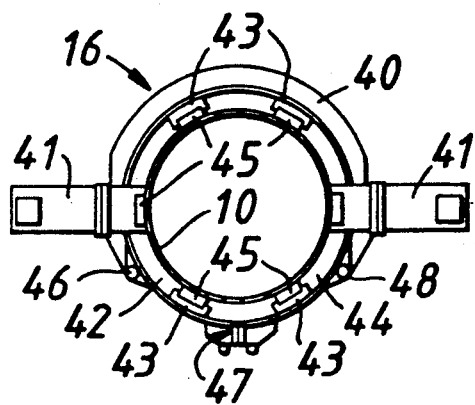

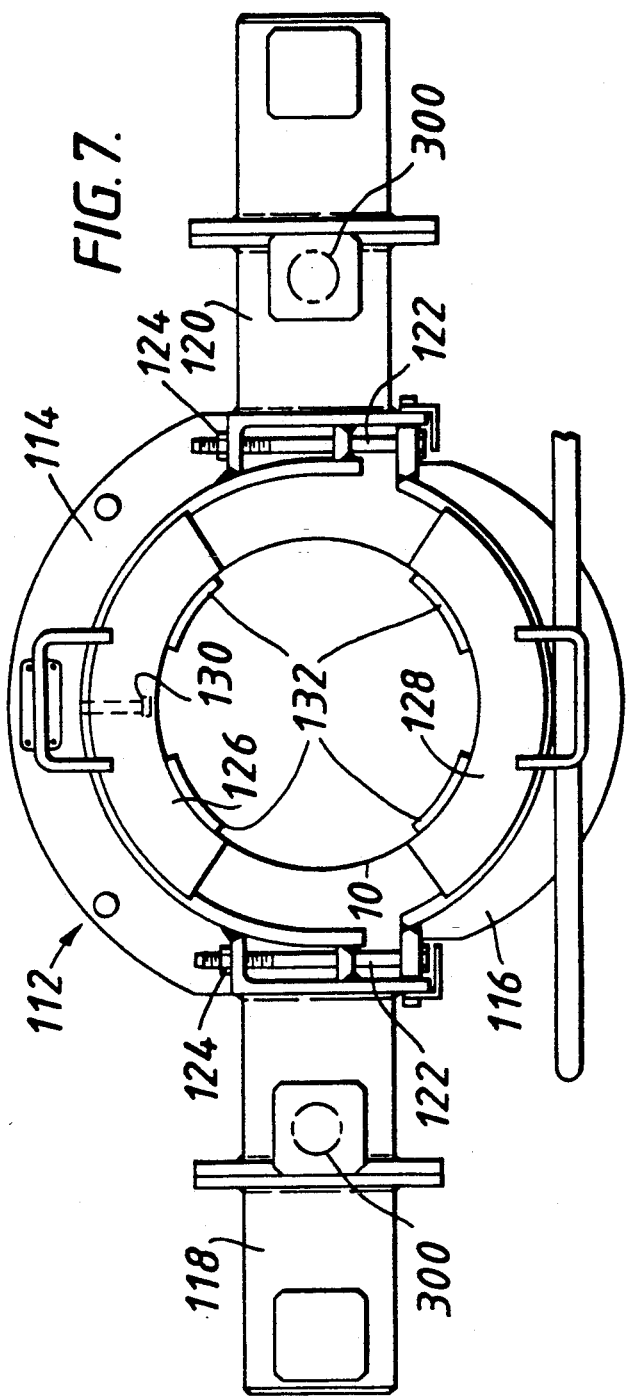
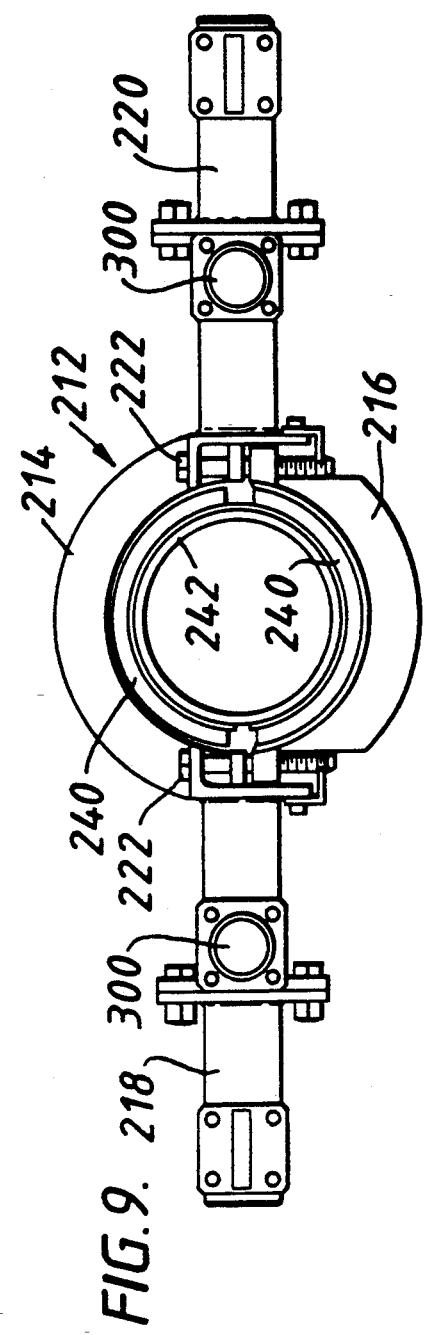

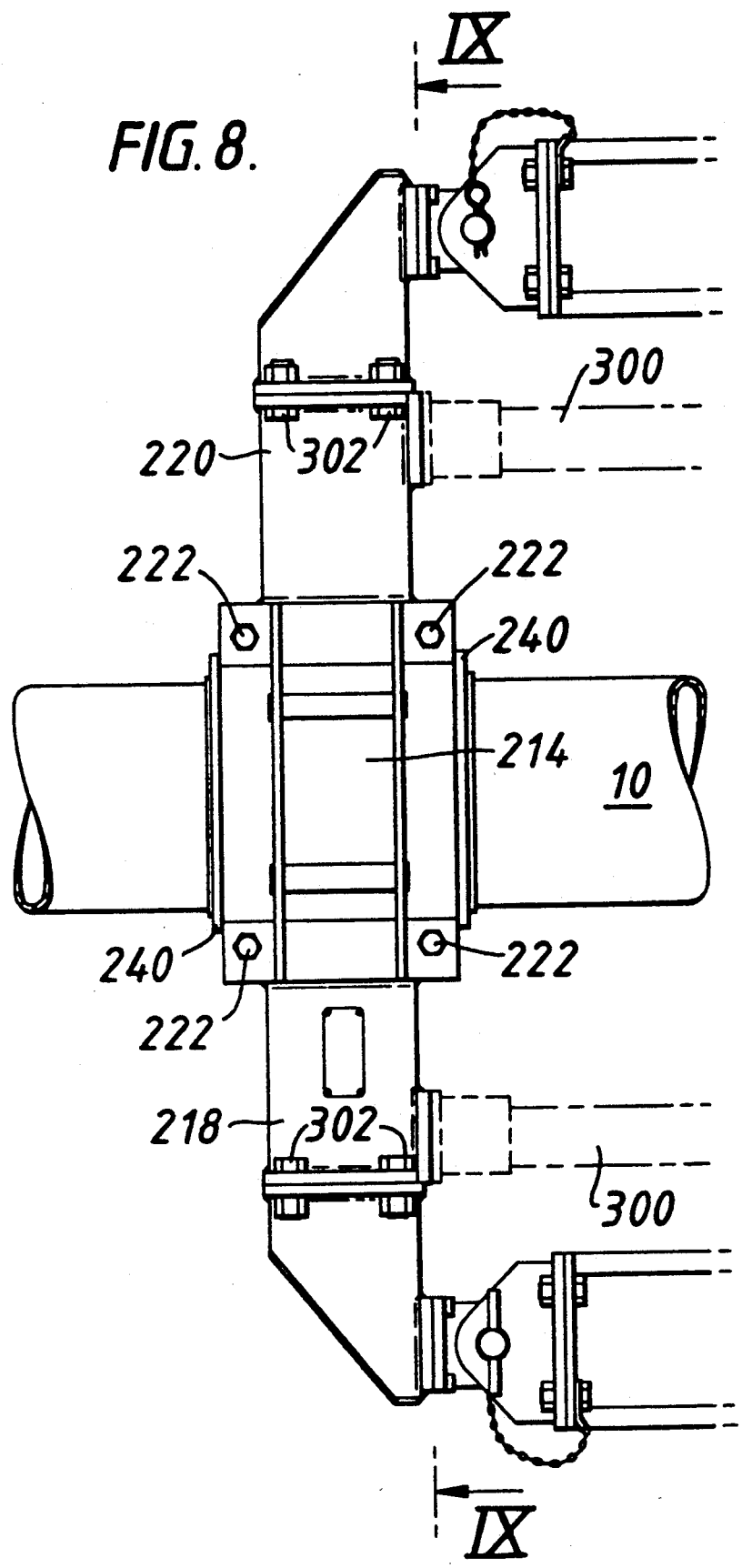

PIPE RESTRAINT SYSTEM

This invention relates to pipe restraint systems.

If a section of a pipe, such as a gas main, for example is removed for the insertion of a valve, say, the pressure of the gas acting on the stopping off plug or bag will generate an axial thrust in the main. This could uncouple joints in the main if it is not restrained during and after the cut-out operation. The invention provides a temporary restraining system which can be applied to the pipeline until the valve is inserted. Afterwards, it can be removed and used elsewhere.

According to the invention, a pipe restraint system comprises two clamp assemblies and two yokes anchored at spaced locations along the pipe and struts engageable at their ends with the yokes, each clamp assembly comprising at least two thrust members distributed around the pipe and tightenable against the pipe and each strut comprising a hydraulic cylinder by which the strut can be loaded to relieve the pipe of load due to gas pressure.

In one form of system, each clamp assembly comprises thrust members linked by a strap or other flexible elongate member to locate them before they are tightened against the pipe by chains.

In another form of system, each clamp assembly comprises two members, one of which is integral with a yoke in each case and the other of which being complementary to the first to enable the members to embrace the pipe and means which enable the two members to be drawn together.

Three forms of pipe restraint system will now be described by way of example with reference to the accompanying drawings:

FIG. 1 is a plan view of one form of pipe restraint system;

FIG. 2 is a section on the line II—II in FIG. 1;

FIG. 7 is a section on the line VII—VII in FIG. 6;

FIG. 8 is a plan view of part of a third form of restraint system; and

FIG. 9 is a section on the line IX—IX in FIG. 8.

Figure 3:
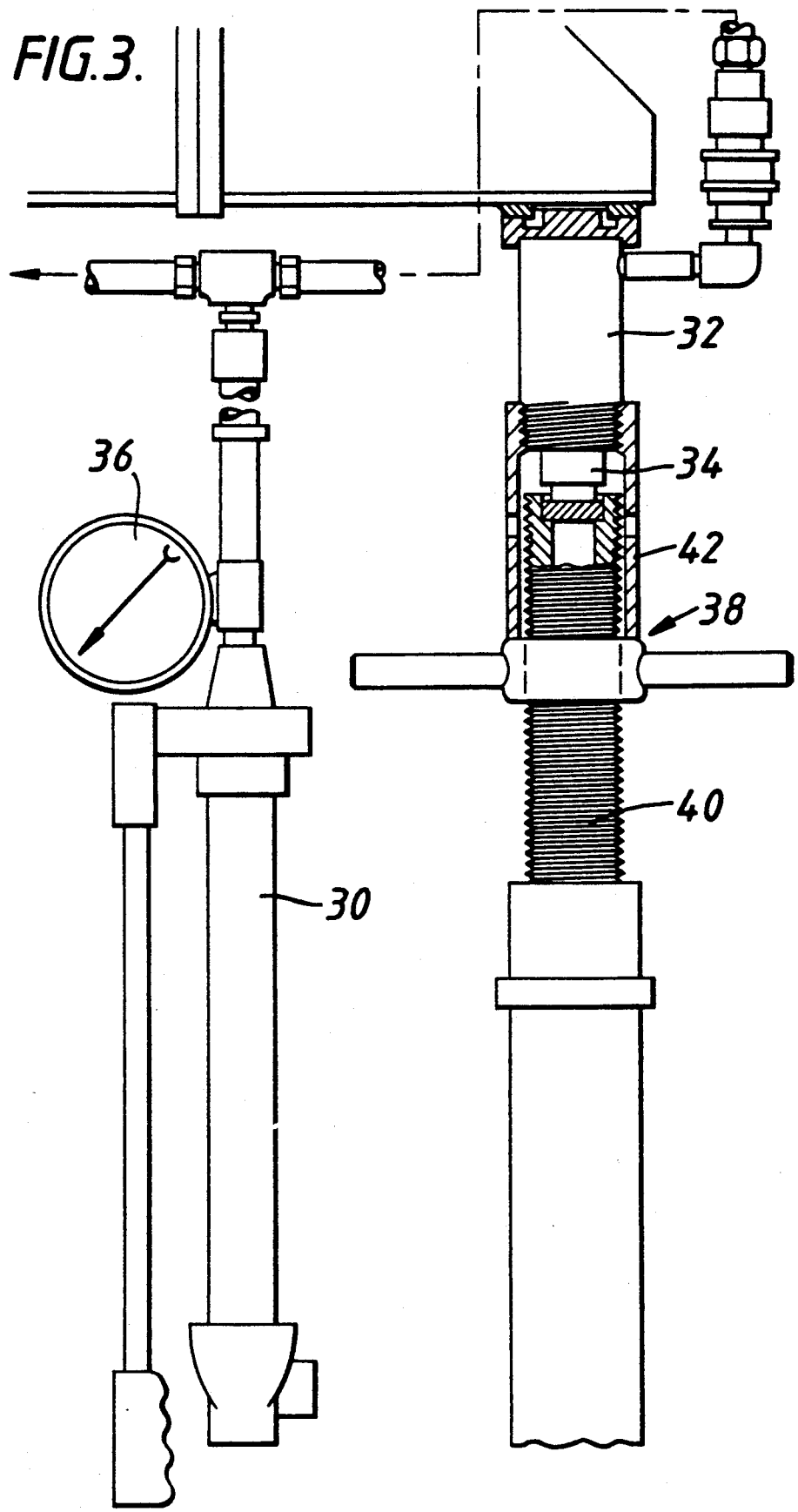
FIG. 3 is a detail showing in plan the device on the strut by which hydraulic load can be applied.

FIGS. 1 and 2 show a gas main 10 and two assemblies each of which provides a clamp assembly 12, 14 and a yoke 16, 18. The yokes 16, 18 are anchored at spaced locations along the pipe or main 10 by the respective clamp assemblies 12, 14.

A strut 20, 22 is engaged at its opposite ends with the yokes 16, 18. A short section 24 of the pipe 10 is required to be removed for the insertion of, for example, a valve. The mains pressure acting on the stopping off plug or bag generates an axial thrust in each remaining part of the main 10 acting in the direction of the respective arrow "A" or "B". Such a force could uncouple joints in the main between adjacent sections of pipe and after the cut-out operation unless held by friction between pipe and ground.

In order to restrain the forces the pipe restraint system is used. The clamp assemblies 12 and 14 are fitted and tightened against the pipe as explained below. The yokes 16, 18 are anchored by the respective clamp assembly 12, 14 the pads of the clamp assemblies 12, 14 engaging in slots in the yokes 16, 18 to prevent rotation of the yokes during loading and the strut 20, 22 is fitted with opposite ends engaging the yokes 16, 18. Each strut is engaged at one end with a strut pin 28 forming part of the yoke 18.

To check the load bearing performance of the system before attempting a cut-out on the main 10, the hydraulic hoses from a hand pump 30 are connected to hydraulic cylinders 32 (FIG. 3) and a pressure applied which activates pistons, such as 34 for example. The pressure is raised until the magnitude as recorded on a pressure gauge 36 is such that the thrust generated in the struts is equal and opposite to the force "A" (or "B").

A table relating mains size, mains pressure and the hydraulic test pressure is provided. The hydraulic test pressure is maintained for 15 minutes during which the amount of slip between the clamp assemblies and the pipe is noted.

Assuming the magnitude of slip (if any) is acceptable, the hydraulic pressure is maintained and a strut lock nut 38 screwed up the threaded shaft 40 of the strut until it engages tightly with the extension 42 secured to the cylinder 32. The hydraulic pressure is then released.

The forces applied by the hydraulic cylinders 32 deflect the yokes in the same way, and by the same amount, as the force generated by the gas pressure in the main 10 acting on the stopping off plug. These forces are equal and opposite to the forces "A" or "B". Therefore, pre-loading the system and locking in the deflection before cut-out will prevent axial movement of the pipeline during and after cut-out due to the elastic deformation of the yoke assemblies. This movement, although small and probably insufficient to uncouple pipeline joints, may be sufficient to cause problems with the pipe cutting machinery.

FIG. 2 shows one of the yokes. It consists of a half yoke 40 and two quarter yokes 42, 44, joined to the half yoke by hinge pins 46, 48.

The half yoke 40 is integral with the arms 41 of the yoke. The half and quarter yokes are provided with shoes 43 at equi-spaced intervals around the main 10 and each shoe carries a distance pipe 45. The two parts of the yoke are tightened by the releasable means 47.

Figure 4:
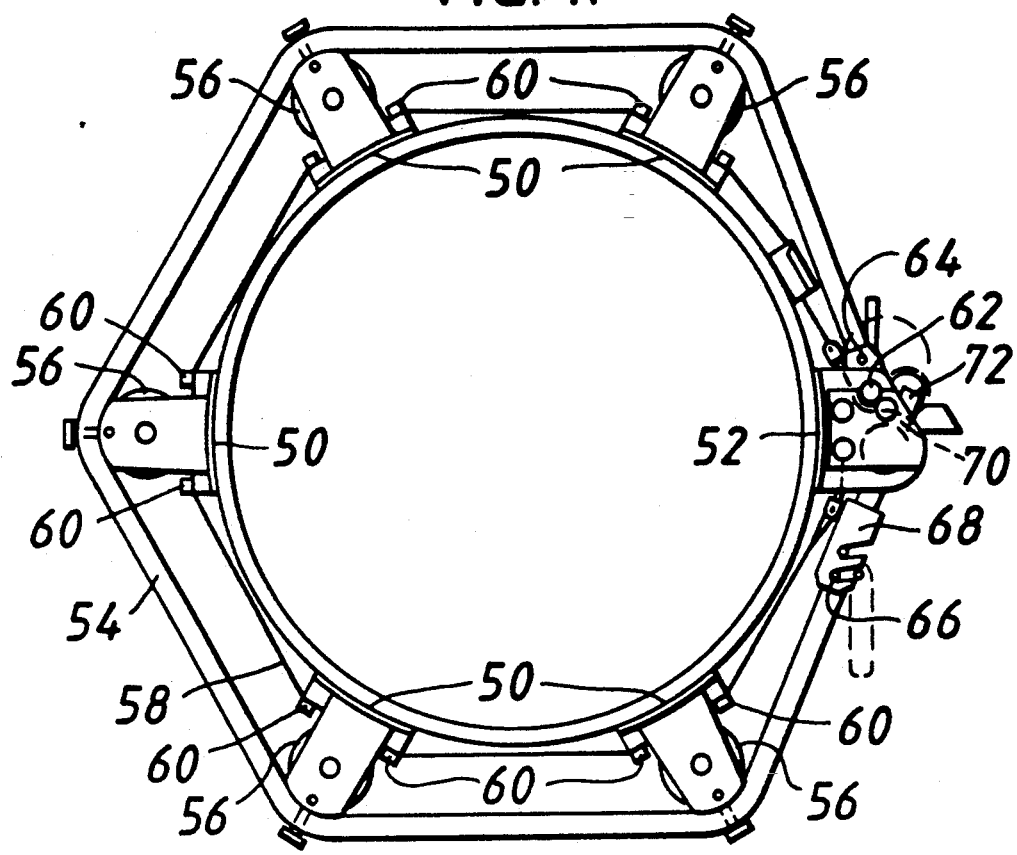
FIG. 4 is a detail in elevation of a clamp assembly.
Figure 5:
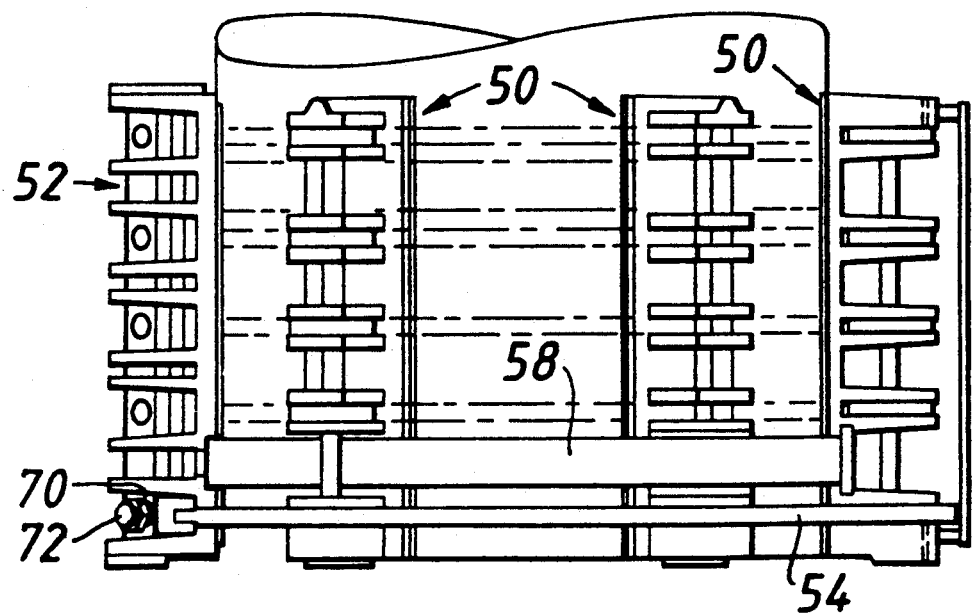
FIG. 5 is a detail in plan of the clamp assembly shown in FIG. 4.

FIGS. 4 & 5 show the clamp assembly 12, say, the other 14 being exactly the same. The system has been designed to accommodate the thrust generated on metallic mains of 16-inch (406 millimeters) up to 24-inch (610 millimeters) nominal bore operating at up to 2 bar. The clamping system is fitted around the pipeline to provide an "anchor" against which an axial thrust ("A" or "B") equal to that experienced by the yokes and so by the pipeline can be reacted. The magnitude of the thrust is equal to the operating mains pressure multiplied by the internal cross-sectional area of the joint socket.

In FIGS. 4 and 5 there are shown six thrust members or pads five of the pads 50 being identical and the sixth pad 52 receiving the ends of chains 54 which force the pads to engage the pipe 10 tightly. There are five chains 54 and each passes over a roller 56 carried by the pad 50. Each pad is made of aluminium alloy and has a steel filled polyurethane liner attached by adhesive to its base. The base is of concave shape to match the curvature of the pipe 10.

The six pads are connected by a fabric strap 58 and can be adjusted until they are equispaced around the pipe 10. The strap 58 is tensioned and locked at the pad 52 and strap clamps 60 are tightened to lock the pads tightly against the pad 10.

Five chains 54 are passed around the pads starting and finishing at the anchor pad 52. At the start end of each chain 54, a rod 62 is passed through anchor links 64 on the ends of the chains and through double eye bearings in the pad 52. Each chain 54 passes over the rollers 56 and chain pivot pins 66, at or towards the finish end of the chains, are engaged in a chain hook 68.

The chains 54 are tensioned by tightening the nuts 70 on the chain hook stud 72 to a pre-determined torque. The area of the clamp is such that a torque of 75 lb.ft will induce a radial force at the clamp sufficient to restrain an axial thrust of 25 tons without slip between the polyurethane liner and the pipe surface.

As the system applies radial pressure to the outer surface of the pipe it must only be used on pipes where corrosion has not significantly reduced their crushing strength.

Figure 6:
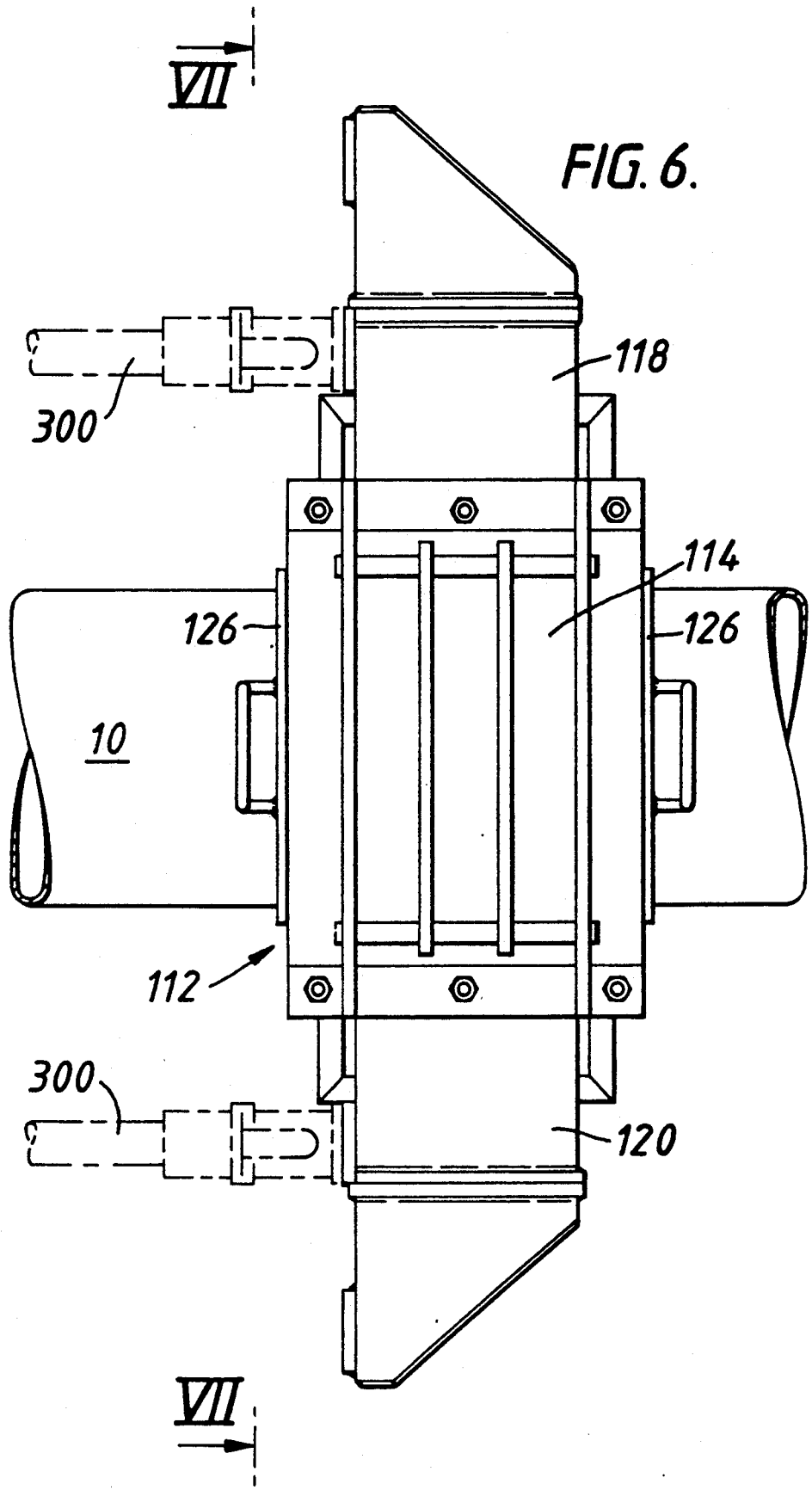
FIG. 6 is a plan view of part of a modified form of restraint system.

FIGS. 6 and 7 show a second form of system. Each clamp assembly 112 (only one is shown) comprises two members 114, 116 which are complimentary to each other to enable them to embrace the main 10. One of the members 114 is integral with a yoke made up of the member 114 and two laterally extending co-linear arms 118,120. The other of the members 116 fits into the yoke and can be tightened in position by two bolts 122 and nuts 124 engaging the bolts 122 using a predetermined torque.

A torque of 75 lbs:foot is used when operating in the Intermediate Pressure system at up to 7 bar and 50 lbs:foot when operating in the medium pressure system at up to 2 bar.

Each member 114,116 has a sleeve 126, 128, respectively, secured to the member 114, 116 by a bolt 130. Steel-filled polyurethane lining pads 132 are attached to the inside surface of the sleeves by adhesive. This form of system is for intermediate size mains and slightly different sleeves can be used to suit the size of the main. The sleeves engage the surface of the main and form the thrust members equivalent to the members 50 and 52 shown in the first embodiment. The sleeve shown in FIG. 7 can be dimensioned to suit mains of between 9 inch (228 mm) cast iron and 14 inch (355 mm) cast iron. A much thinner sleeve (not shown) is suitable for 15 inch (381 mm) cast iron and 16 inch (406 mm) steel.

FIGS. 8 and 9 show a third form of system intended for the smaller sizes of main. Each clamp assembly 212 (only one is shown) comprises two members 214, 216 which are complementary to each other to enable them to embrace the main 10 after a polyurethane liner 242 has been wrapped around. One of the members 214 is integral with a yoke made up of the member 214 and two laterally extending arms 218,220. The other of the members 216 fits into the yoke and can be tightened in position by two bolts 222, which engage nuts (not shown). A bolt torque of 75 lbs:ft will provide restraint when working on mains operating at up to 7 bar pressure.

For use with 8-inch (203 mm) cast iron main pipe, the clamps do not use sleeves and the members 214, 216 directly engage the main fitted with polyurethane liners and are equivalent to the members 50 in the first form of system described with reference to FIGS. 1 to 5 above.

For other sizes of main, the members 214, 216 have sleeves 240, which engage upon the wrap around polyurethane liner fitted to the main. The sleeves 240 are held in position, in each case, by a bolt (not shown) passing into the member. The sleeves in this case actually correspond to the thrust members 50 described with reference to FIGS. 1 to 5 in the first system.

For the system shown in FIGS. 8 and 9 the sleeves can be designed to suit main diameters of from 4-inch (100 mm) all irons and steels to 8-inch (237 mm) ductile iron and steel.

FIGS. 6 and 7 and also FIGS. 8 and 9 show, in broken lines, struts 300 located inboard in relation to the yokes. Such struts 300 can be used depending on the space available around the main and also on the type of cutting machine used.

The extreme end portions of the yoke arms can be demounted by means of releasable bolts 302 (shown in FIG. 8 only for simplicity) when the struts 300 are used. Similar arrangements are of course available in the case of the system shown in FIGS. 1 to 5.

I claim:

1. A pipe restraint system comprising two clamp assemblies and two yokes anchored at spaced locations along a pipe and struts engageable at their ends with the yokes, each clamp assembly including at least two thrust members distributed around said pipe and chains by which said thrust members are tightenable against the pipe, said thrust members linked by a strap or other flexible elongate member to locate the members before they are tightened against the pipe by said chains, and each strut including a hydraulic cylinder applying a force to said struts in a direction opposite to the direction of axial thrust the would be generated in the pipe if a flow of gas in the pipe was stopped off, thereby relieving the pipe of load that would be generated by the axial thrust.

2. A system according to claim 1, one thrust member receiving the ends of the chains.

3. A system according to claim 2, the remaining thrust members carrying rollers over which the chains pass.

4. A system according to claim 1, each strut comprising a device by which the load applied by the cylinder can be maintained after the hydraulic pressure in the cylinder has been removed.

* * * * *